Oct. 1, 1929.    P. T. ZIZINIA    1,730,048
APPARATUS FOR SPRAY DRYING LIQUID MATERIALS
Filed Sept. 20, 1926    3 Sheets-Sheet 1
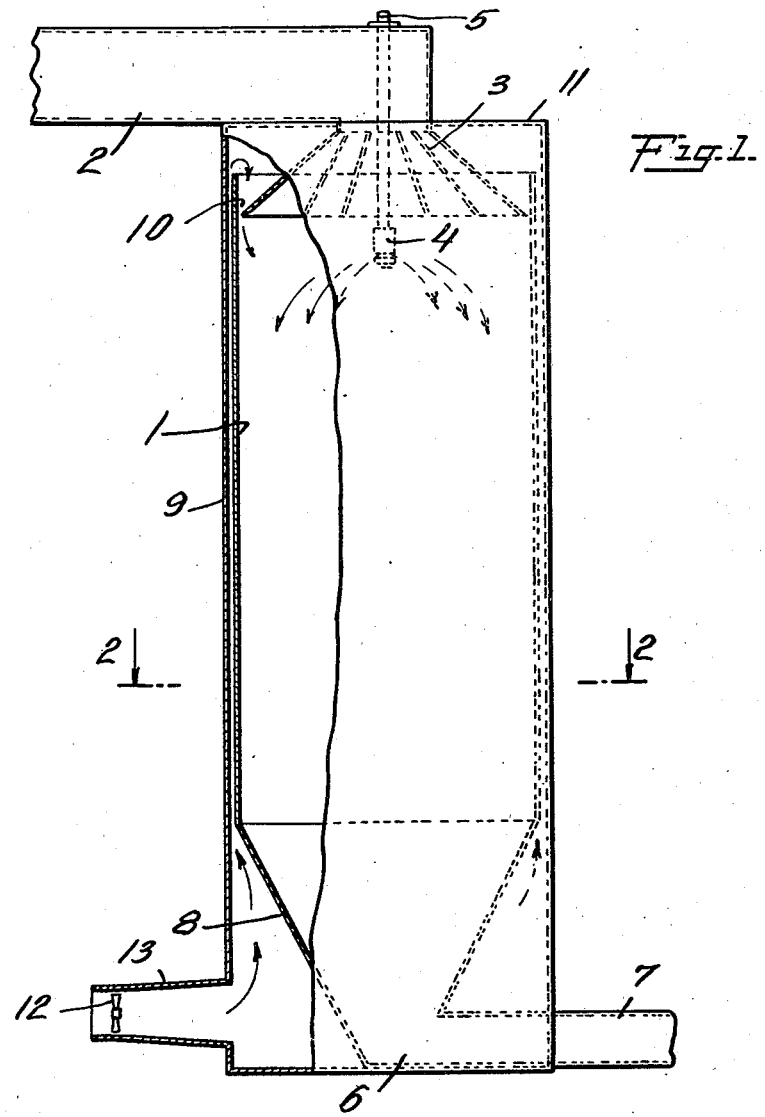
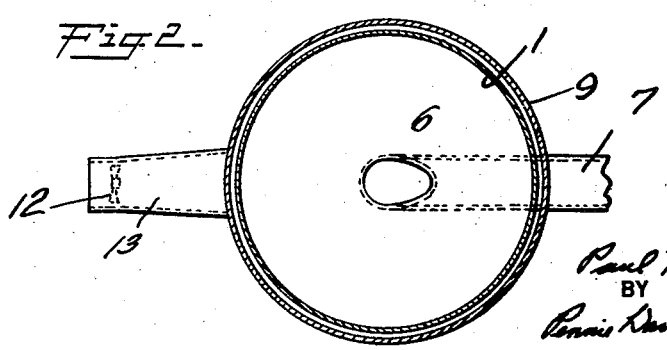
INVENTOR
BY
ATTORNEY

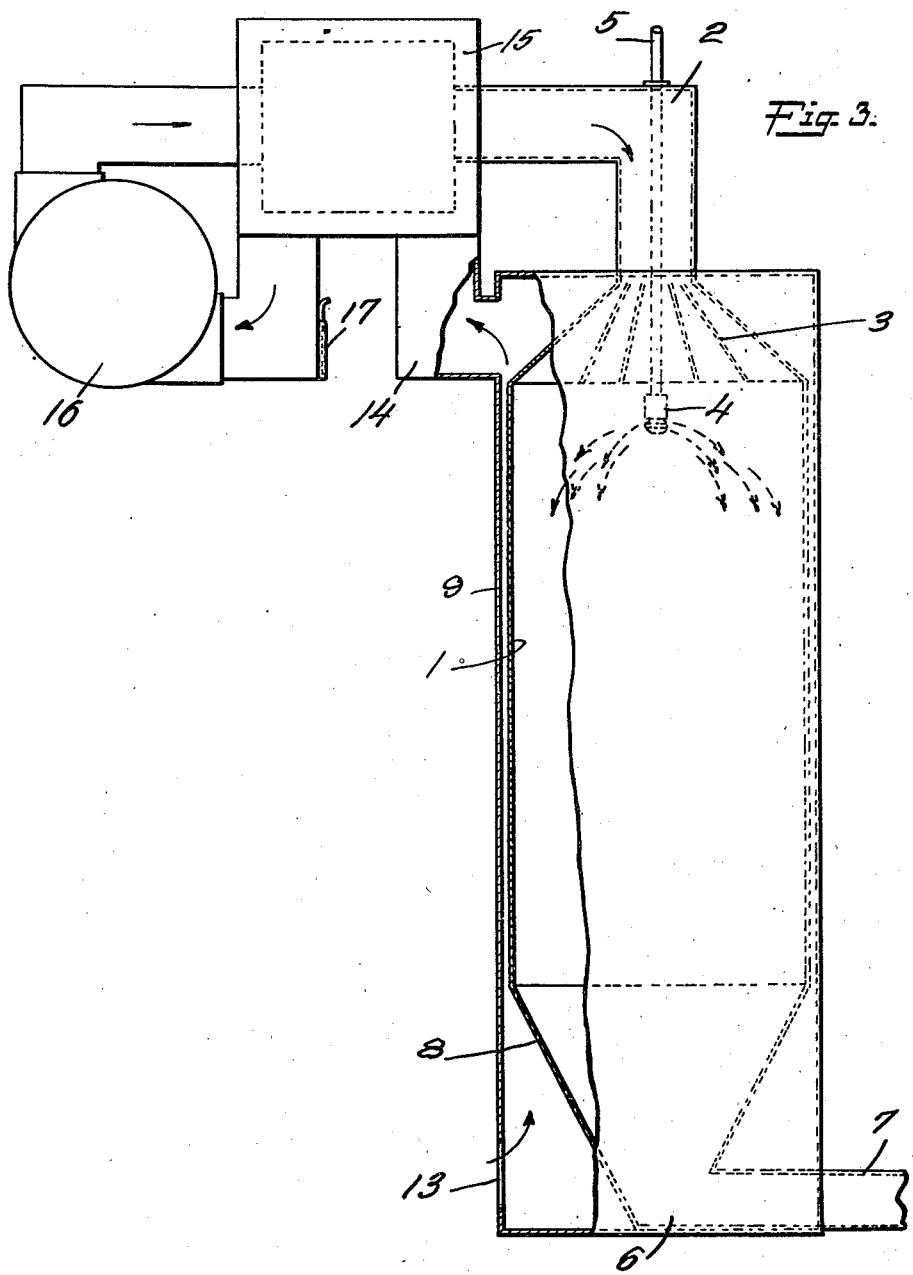

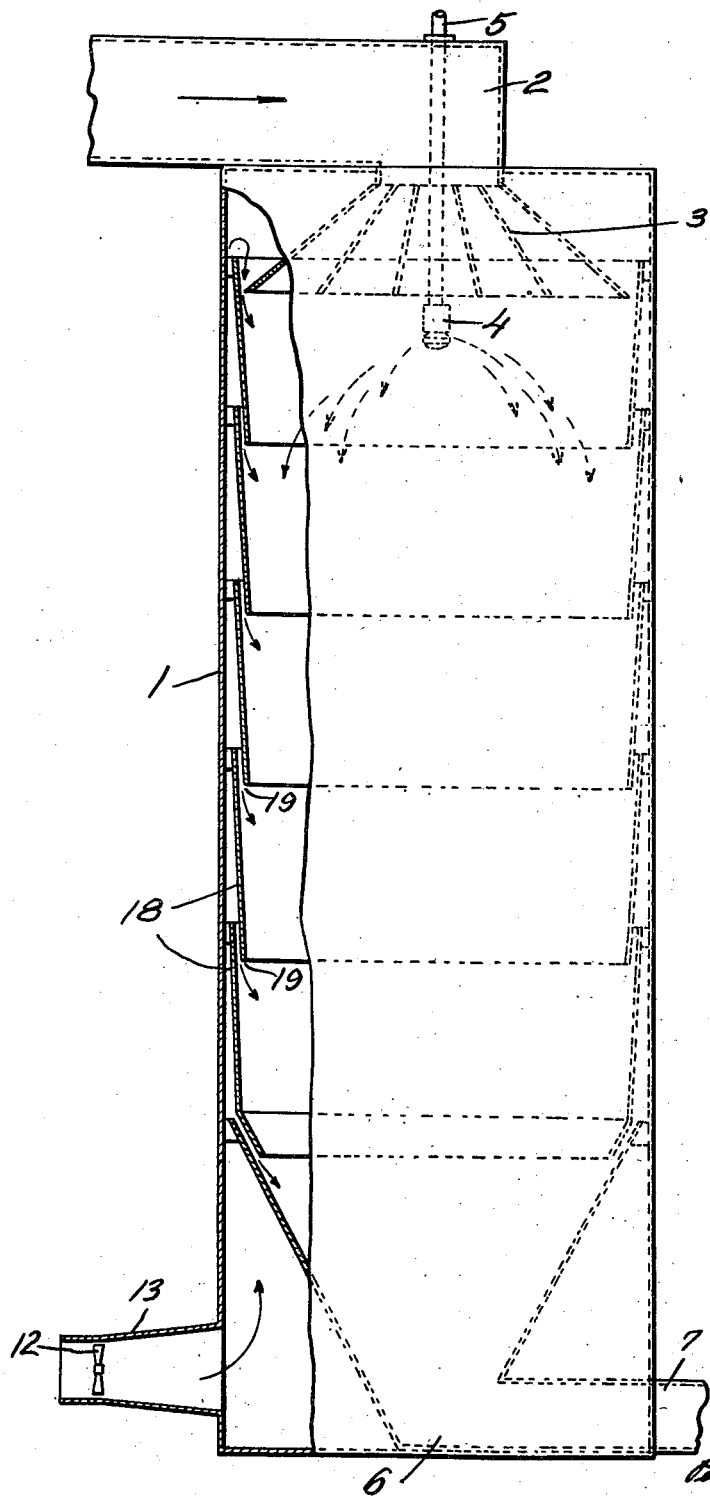

Patented Oct. 1, 1929

1,730,048

UNITED STATES PATENT OFFICE

PAUL T. ZIZINIA, OF BELMAR, NEW JERSEY

APPARATUS FOR SPRAY DRYING LIQUID MATERIALS

Application filed September 20, 1926. Serial No. 136,714.

The present invention relates to apparatus for use in practicing spray-drying processes or other processes where a material is treated by suspending it in finely divided condition in a heated gas, and has to do particularly with an efficient utilization of the heat required in the process, a treatment of the walls of the drying chamber or tower to minimize danger of injury to the product arising out of contact of the material being treated with the walls of the apparatus, and the control of the movement through the apparatus of the material being treated.

The normally solid constituents of liquid materials may often be recovered directly in dry powder form by spraying the liquid material in finely divided condition into a suitably heated current of an appropriate drying gas. The heat energy present in the heated gas serves to vaporize the moisture of the liquid, and the gas when supplied in proper quantity absorbs and carries away this moisture without becoming reduced to saturated condition. The normally solid constituents of the liquid material thus appear in the drying gas while the moisture contained in the particles of the sprayed liquid material evaporates, and they occur as small independent particles of solid material in suspension in the moisture carrying current of spent drying gas. These solid particles are then separated from the current of spent drying gas and are collected to form the finished powder product. The success of this process in obtaining a uniform dry powder product from solid containing liquid materials depends upon the carrying of each particle of the material being treated in suspension in the drying gas so that all of the particles of the product pass through the drying tower in like manner and receive a substantially identical treatment. In attaining the conditions requisite for the best spray-drying operation a concurrent flow of the drying gas and of the sprayed material has certain definite advantages. In this type of process the particles of the finely divided sprayed liquid material under treatment are introduced into the initial portion of the current of heated drying gas. The particles are entrained in the gas current and are positively carried through the apparatus by the current so that all of the particles remain in the apparatus for substantially the same length of time. The present invention relates primarily to spray-drying apparatus for use in carrying out a process wherein a concurrent flow of drying gas and material being treated is employed, but it is also applicable and is of certain value in the conduct of other types of spray-drying processes.

One of the important difficulties in the drying of materials, particularly perishable materials, is the danger of injury to the product arising out of contact of the particles of the material with the walls of the tower. Practically all materials which at some degree of concentration assume a syrupy sticky consistancy as, for instance, molasses, malt syrups, sugar, in fact food products in general, and even certain inorganic materials such as chrome tannage, sodium silicate, and the like, offer considerable difficulty in sticking and caking on the walls of the apparatus and are usually injured by contact with the hot walls to such extent as to render them unfit for use. Certain materials, as, for instance, fine white clays may be discolored by even a brief contact with iron. This difficulty of sticking of the product to the walls of the apparatus and the consequent danger of injury to the product is encountered in the production on a commercial scale of a large variety of products, particularly the products above noted which are of a syrupy nature but also with a considerable number of other products. In the drying of the material, the tower becomes filled with particles ranging through all stages of concentration from the original liquid material to the ultimate dry product. In the ordinary drying tower the walls of the apparatus become very hot. If, for instance, a liquid or partly dried particle contacts with the hot wall the portion of the particle which strikes the wall rapidly loses moisture by evaporation for the reason that the metal of the wall is a good conductor of heat and quickly supplies to the particle all of the heat which is necessary for evaporating its moisture. Furthermore, since the material of the walls is very hot and is a good conductor of heat, the solid material in the particle which strikes the wall is quickly burned and destroyed if it is a material of such nature as to be injured by exposure in dry condition to a temperature equal to that of the tower wall. The rapid evaporation of the moisture of the particle which takes place as it contacts with the wall increases the tendency to stick, and after a particle has once become stuck to the wall it serves as a nucleus for the sticking and building up of other particles.

The present invention provides for minimizing the danger of injury to the product which is likely to arise out of a casual contact of the particles of material being treated with the tower walls. The amount of heat required to reduce solid containing liquid materials to dry powder form is quite large, and in carefully designed spray-drying plants special precautions, such as insulation on the outside of the tower and the like, are taken to prevent unnecessary heat loss. In ordinary practice, therefore, the inner walls of the tower attain a temperature which is comparable with that of the hot gases passing through the apparatus. In certain instances the drying tower is even jacketed and the hot drying gas is passed through the jacket to thus heat the tower wall before it is admitted to the inside of the tower. When steam coils are used as the heating element for the drying air they are sometimes placed in the jacket which surrounds the tower, and the air in passing through the jacketed space becomes heated and flows along in contact with the outer surface of the tower wall before it enters the tower.

I have found, however, that injury to the product and the operational difficulties arising out of contact of the material being treated with the tower walls can be greatly reduced by cooling the walls. When the walls are kept reasonably cool a partly dried particle, for instance, may contact with the wall and still not be burned. When it contacts with the wall there is no rapid evaporation and resulting sticking action as in the case of contact with a hot wall. In an apparatus where the flow is well controlled and only a casual contact of the particles with the wall is experienced I have found that the difficulties arising from such contact are substantially avoided when the walls are maintained cool in the manner described herein. In certain apparatus and processes heretofore proposed cool air has been admitted to the drying chamber, but such cool air has been used with the idea of reducing the temperature of the product and the gas current carrying the product at or after the point at which desiccation is complete so that the product will not suffer injury by being carried in suspension after it is dry in a gas of temperature sufficiently high to injure the dry product.

The present invention provides for cooling the tower walls by passing a current of air of appropriate temperature in heat transferring relation with the outer surface of the walls. This may conveniently be done by jacketing the entire drying tower and passing a current of cool air along the length of the tower through the jacketed space. In the concurrent flow process the jacketing current of cool air is preferably passed in a direction generally opposite to that of the principal flow of drying air and material under treatment. This is done so that the walls at the lower end of the tower will be kept at the lowest temperature. The jacketing air becomes warmer as it flows up along the length of the tower, with the result that the upper portion of the tower wall is somewhat warmer than the lower portion. The amount and velocity of the jacketing air are so regulated that the tower walls are maintained throughout the length of the tower at appropriate temperatures. This cooling of the tower walls is accomplished by the present invention, and at the same time an efficient utilization of heat is provided for. By supplying to the cool air jacket a proper amount of air at a proper velocity the outside wall of the jacketed space can be kept so cool that the heat loss by radiation is negligible. If desired, this same idea can be extended to the furnace which supplies the hot drying air for the process. All of the air which is used in cooling the walls is utilized in the process either by being passed directly to the tower or by being passed to the furnace, thus returning to the system all of the heat which is transferred to the stream of cooling air.

The apparatus of the present invention is illustrated in the accompanying drawings. In the drawings, Figure 1 is a vertical sectional view showing a spray drying apparatus embodying the present invention; Figure 2 is a horizontal sectional view taken on line 2—2 of Figure 1; Figure 3 is a view similar to Figure 1, somewhat diagrammatic, illustrating a modified form of apparatus; and Figure 4 is a similar view illustrating a further modified type of apparatus.

Referring to the drawings, 1 indicates the main vertically positioned spray drying tower. The hot drying air is supplied to the tower 1 through an inlet duct 2 which opens out into the full diameter of the tower 1 through an appropriate air distributing element 3 designed to distribute the incoming air uniformly across the section of the tower so that the downward flow of air through the tower will proceed in an orderly fashion without any substantial amount of whirling or eddying. The liquid material to be dried is delivered into the initial portion of the incoming current of drying gas by means of a spray nozzle 4 supplied through line 5 which is connected with a suitable storage reservoir or pumping system for supplying the liquid as it is required for the process. The sprayed finely divided liquid material is entrained in the current of drying air and is carried in suspension in the air while the evaporation of the moisture from the liquid particles and the consequent reduction of the particles to small independent particles of solid material is taking place. The entire contents of the drying tower are preferably discharged through the outlet opening 6 at the bottom of the tower and from thence are conveyed through duct 7 to an appropriate separating and collecting apparatus for recovering the finely divided dry material and discharging the spent drying gas to waste. The cone portion 8 at the bottom of the tower 1 serves as a directing funnel for converging the contents of the tower into the relatively small discharge duct 7. The drops of sprayed material together with the particles of dried solids which are produced in the tower are positively propelled downwardly through the drying tower so that a uniform length of treatment for every portion of the product is assured.

In the apparatus shown in Figure 1 the entire spray drying tower 1 is jacketed by means of an outer casing or housing 9 which fits about and encloses the tower 1, leaving a relatively narrow air space between the jacket 9 and the outside of the tower wall. The distributing element 3 closes off the top of the tower with the exception of the circumferential opening 10 between the walls of the tower and the outer edge of the distributing element. The jacket 9 has a top cover 11 which closes both the tower itself and the jacketed space at the outside of the tower. Thus, air passing up within the jacket 9 passes the top of the tower 1 and is deflected downwardly by the cover plate 11 so that it circulates around the outside of the distributing element 3 and passes into the main portion of the tower 1 through the space 10 at the outside edge of the distributor. The circulation of air through the jacketed space is established by a fan 12 supplying air through a duct 13 into the lower end of the jacket 9. The air passing down into the tower through the circumferential space 11 serves as a protective air sheet extending for a certain distance down the walls of the tower 1 below the lower end of the distributor 3 and the spray nozzle 4 to thus restrict contact of the sprayed material with the tower walls along that portion of the tower.

In the operation of the apparatus the fan 12 draws in air at atmospheric temperature and passes it into the lower end of jacket 9, whereupon it circulates about the outside of the cone portion 8 of the tower. From thence the air passes upwardly through the jacket 9 in a moving sheet completely enclosing the entire tower 1. The pressure maintained by the fan 12 is such that a flow will take place up along the sides of the tower and down past the distributor 3 and into the tower through opening 11, from whence the air mingles with the main current of drying air and proceeds with it down through the tower 1 and out at the discharge opening 6. The fan 12 ordinarily delivers atmospheric air to the apparatus, but if desired the air handled by the fan may be tempered by passing it through a heat exchanger before it is delivered to the apparatus. The velocity at which the air is passed up through the jacket 9 will be regulated to best suit the particular drying process which is being carried out. A relatively high velocity promotes a better heat transfer between the tower wall 1 and the moving current of air and also serves to conduct off the heat more quickly so that both the wall 1 and the outer wall of the jacket 9 will be cooler. Ordinarily a velocity which is sufficiently high to keep the outer jacket 9 fairly cool throughout its entire length will be suitable for the operating requirements of the apparatus. The outer jacket 9 may be heat insulated, but such insulation may ordinarily be dispensed with. The heat taken up by the air moving within the jacket 9 is utilized in the process for the reason that the air is returned to the tower. This air entering the tower through the circumferential opening 11 is at a fairly high temperature because of its circulation about the outer side of walls 1 and finally about the distributor 3.

In the apparatus of Figure 3 the air current which jackets the tower 1 is passed to the furnace instead of being passed directly to the tower. Also, this air circulates about the outside of the furnace before it is passed into the furnace. In this apparatus the air which enters the jackets 9 at its lower end, as indicated at 13, passes up along the length of the tower and from thence into a duct 14 rather than into the tower. The distributing element 3 caps the top of the tower tightly so that no air from the jacket 9 can proceed directly into the interior of the tower. The air issuing from the upper end of jacket 9 passes through duct 14 and from thence into jacket 15 which encloses the furnace or heater designed to heat and deliver to the tower 1 at the proper temperature its entire supply of drying air. In the apparatus here shown the fan 16, which generates both the air current through the heat insulating jackets 9 and 15 and the main drying air current for the apparatus, is positioned just ahead of the heater so that at its suction side it draws air from the heater jacket 15 and its discharge side delivers air to the main heater, from whence the air passes through duct 2 and distributing element 3 into the tower 1. If it is desired not to draw all of the air supply through the heat insulating jackets 9 and 15 the damper 17 at the suction side of the fan may be opened to admit a desired proportion of air immediately at the discharge side of the fan. The outside of the furnace jacket 15 may be heat insulated if desired, but this is ordinarily not necessary. With this arrangement the utilization of the heat of the system is particularly effective for the reason that radiation from both the drying tower and the main air heater is reduced to a negligible minimum. The heat picked up by the air current in the tower jacket 9 and the furnace jacket 15, in being returned to the furnace, lessens the amount of heat required to raise the temperature of the air delivered to duct 2 to the proper value and has the further advantage that the entire body of air delivered to the tower 1 is of a uniform temperature throughout.

The apparatus of Figure 4 is a modified type of tower in which the jacketing of the tower is combined with the idea of admitting to the tower at several points along its length moving sheets of air extending circumferentially about the entire inner wall of the tower and proceeding downwardly along the tower wall to prevent objectionable contact of material with the wall. This feature of the protective air sheets for preventing contact of the particles of material with the tower walls is disclosed and claimed in my co-pending application Ser. No. 136,713, filed September 20th, 1926, which has matured into Patent No. 1,634,640, and the present invention is not directed broadly to this feature, but rather to the combination of this feature with the other cooperating features embodied in the apparatus. The apparatus of Figure 4 affords the several advantages of cooling the tower walls, minimizing heat radiation losses by the air jackets and at the same time returning to the system the heat taken up by the jacketing air, and providing the protective air sheets for saving the tower walls from contact with the material under treatment. In this apparatus the main tower wall 1 constitutes the outer wall of the air jacketing space. The inner wall of the tower consists of a succession of overlapping sheet metal rings 18 mounted to provide an air jacketing space between them and the wall 1 and separated slightly at their overlapping ends, as indicated at 19, to form circumferential slots or openings which discharge downwardly along the walls the protective sheets of air. The jacketing air is supplied by means of fan 12 and passes upwardly along the entire length of the tower, circulating about the outside of the distributor 3 and passing down through circumferential opening 11 as in the apparatus of Figure 1. The action and operation of the apparatus is essentially the same as that of Figure 1 except that a certain portion of the jacketing air issues into the tower at the successive openings 19 and does not all proceed the entire distance to the top of the tower. As the air proceeds up along the tower it becomes warmer so that the protective sheets of air admitted through successively higher openings 19 become successively warmer. In certain instances the admission of sheets of air which become successively cooler in the direction of flow through the tower, or even the cool tower walls as in the apparatus of Figures 1 and 3, may be taken advantage of to minimize the amount of cooling air which must be admitted at the lower end of the tower for the purpose of facilitating recovery of certain products, such as sticky syrupy substances, in proper form. The presence of the cool walls effects a certain reduction in the temperature of the stream of material passing down through the tower. The temperature of the material when it reaches the the bottom of the tower may thus be less than it normally would be in case the walls of the tower were not cooled, and therefore a correspondingly lesser amount of cooling air need be admitted to reduce the temperature of the product to a degree which is satisfactory for handling.

The present invention, therefore, provides for a special treatment of the walls of the tower to minimize injury to the product arising out of contact of the particles of the material with the tower walls. This is accomplished by cooling the entire tower wall. The effect of such cooling is a lessening of the tendency of the particles of material to stick to the walls upon casual contact with them and elimination of the danger of burning or similar injury because of such contact. The cooling of the walls is accomplished by directing an appropriate gas, preferably atmospheric air, into heat exchanging relation with the entire area of the walls. The air thus employed is returned to the system, either directly to the tower or to the furnace, thereby effecting a conservation of heat. Necessity of heat insulating the outer surface of the tower is avoided, so that a more effective plant affording better comfort for its operators is provided at an expense not greatly exceeding that of an insulated tower built in the ordinary manner. The conservation of heat is further increased by air jacketing the furnace as well as the tower. The tower, particularly when provided also with the protective air sheets for preventing contact of the material with the walls, affords an apparatus in which even the most difficult products may be handled in full scale production without trouble.

I claim:

1. Spray-drying apparatus of the class described which comprises a drying chamber within which the drying of the material takes place, means for passing a current of heated drying gas through said chamber, means for introducing the material being dried into the said current of drying gas in finely divided condition and means for cooling the walls of the drying chamber throughout an area which extends to that part of the chamber in which the material under treatment is not yet thoroughly dried appreciably affecting the temperature conditions of drying within said chamber, whereby danger of injury to the material due to contact of the particles of the material with the walls of the drying chamber is minimized.

2. Spray-drying apparatus of the class described which comprises a drying chamber wherein the drying operation is conducted, means for establishing a current of heated drying gas through said chamber, means for introducing the material being dried into the said current of drying gas in finely divided condition and maintaining said material in suspension in the gas until the drying thereof is completed, means for cooling the walls of the drying chamber at a portion of said chamber wherein drying of the said material takes place to a temperature materially less than that of the said current of heated gas flowing adjacent said walls, and means for separating and collecting the dried product from the spent drying gas.

3. Spray-drying apparatus of the class described comprising a drying chamber, means for supplying heated drying gas to said chamber, means for introducing the material under treatment into said drying gas in finely divided condition and maintaining said finely divided material in suspension in said gas until the drying thereof is completed, and means for passing in heat exchanging relation with the walls of said chamber a fluid of temperature substantially less than that of the heated drying gas flowing adjacent said walls to thereby cool said walls and thus minimize the danger of injury to the product by reason of contact of the particles of material suspended in said gas with said walls.

4. Spray-drying apparatus of the class described which comprises a drying chamber having heat conducting walls, means for passing a current of heated drying gas through said chamber, means for spraying the material being dried into the current of heated gas in finely divided condition and means for passing a cooling fluid in direct contact with the outside of the said heat conducting chamber walls in the region where the actual drying takes place to thereby cool the inner surfaces of said walls and thus minimize the danger of injury to the product due to contact of particles of the product with said walls.

5. Spray-drying apparatus of the class described which comprises a drying chamber having heat conducting walls, means for passing a current of heated drying gas through said chamber, means for introducing the material being dried into said current of heated drying gas, means for circulating cooling gas in contact with the outside of the said chamber walls for cooling said walls without substantially affecting the temperature conditions of drying within said chamber, and means for passing said circulating gas warmed by its said contact with the drying chamber walls into the drying chamber.

6. Spray-drying apparatus of the class described which comprises a drying chamber having heat conducting walls, means for introducing into said chamber a current of heated drying gas, means for spraying the material under treatment into said current of drying gas in finely divided condition, means for circulating a gas in contact with the outer side of the innermost walls of the drying chamber to thereby cool said walls and means for passing the circulating gas into the drying chamber adjacent the inner walls thereof in the form of a relatively thin sheet extending continuously about the periphery of the said chamber, whereby contact of the particles of material being treated with the walls of the said chamber is restricted.

7. Spray-drying apparatus of the class described which comprises a drying chamber having heat conducting walls, means for introducing into said chamber a current of heated drying gas, means for spraying the material under treatment into said current of drying gas in finely divided condition, means for circulating gas in contact with the outer side of the innermost walls of the drying chamber to thereby cool said walls, and means for passing the warmed circulating gas into the said drying chamber at a plurality of points in the form of sheets extending continuously around the inner periphery of the drying chamber and being spaced so that the effect of each sheet persists along the length of the chamber at least as far as the next succeeding sheet, whereby contact of the material being treated with the walls of the drying chamber is restricted throughout the entire chamber.

8. Spray-drying apparatus of the class described which comprises a drying chamber having heat conducting walls, means for passing a current of heated drying gas through said chamber, means for introducing the material being dried into the said current of heated drying gas in finely divided condition, means for passing a cooling gas in contact with the outside of said heat conducting chamber walls to thereby cool the inner surfaces of said walls and progressively warm the said cooling gas as it proceeds along the length of the drying chamber, and means for admitting at different points along the length of the tower quantities of the said progressively heated gas at successively increasing temperatures, said gas being admitted in the form of sheets extending continuously about the periphery of the said chamber, whereby contact of the particles of material being treated with the walls of the said chamber is restricted.

9. Spray-drying apparatus of the class described which comprises a vertically positioned drying tower, means for passing downwardly through said tower a current of heated drying gas, means for introducing the material under treatment into the initial portion of said current of drying gas in finely divided condition and maintaining said finely divided material in suspension in and in concurrent flow with the said gas until the drying of the material is completed, and means for passing in direct heat exchanging relation with the outside of the walls of said tower a cooling fluid proceeding along the length of the tower in a generally opposite direction of flow to that of the principal current of material proceeding through the drying tower to thereby cool the walls of said tower and to cool said walls to the greatest extent at the discharge end of the apparatus.

In testimony whereof I affix my signature.

PAUL T. ZIZINIA.